(12) United States Patent
Yamazaki

(10) Patent No.: US 7,957,464 B2
(45) Date of Patent: Jun. 7, 2011

(54) DIGITAL SIGNAL RECEIVER

(75) Inventor: Mitsuo Yamazaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/759,535

(22) Filed: Apr. 13, 2010

(65) Prior Publication Data

US 2011/0013689 A1    Jan. 20, 2011

(30) Foreign Application Priority Data

Jul. 16, 2009   (JP) .................................. 2009-168223

(51) Int. Cl.
*H03K 7/04*   (2006.01)
(52) U.S. Cl. ........ 375/239; 375/316; 375/219; 375/242; 375/241
(58) Field of Classification Search .................. 375/316, 375/239, 219, 242, 241
See application file for complete search history.

(56) References Cited

U.S. PATENT DOCUMENTS

| 5,691,665 | A | * | 11/1997 | Ohtani | 329/313 |
| 5,905,759 | A | * | 5/1999 | Ishida et al. | 375/282 |
| 2005/0094756 | A1 | * | 5/2005 | Bertram | 375/360 |
| 2006/0188048 | A1 | * | 8/2006 | Suzuki et al. | 375/361 |
| 2008/0111717 | A1 | * | 5/2008 | Miura et al. | 341/50 |
| 2008/0267301 | A1 | * | 10/2008 | Alfano et al. | 375/258 |

FOREIGN PATENT DOCUMENTS

| JP | 09-098193 | 4/1997 |
| JP | 09-197039 | 7/1997 |
| JP | 2001-111633 | 4/2001 |

* cited by examiner

*Primary Examiner* — Shuwang Liu
*Assistant Examiner* — Kenneth Lam
(74) *Attorney, Agent, or Firm* — Blakely, Sokoloff, Taylor & Zafman LLP

(57) ABSTRACT

A digital signal receiver including: a signal edge detector configured to receive a signal including a code and detect an edge of the signal; a reference point detector configured to detect a reference point for pulse width detection from a rising time point or falling time point of the edge detected by the signal edge detector; a pulse width detector configured to detect a pulse width from the rising time point or falling time point of the edge and the reference point; a sampling point determination module configured to generate a histogram of the pulse width and determines a sampling point of the code based on an analysis result of the histogram; and a sampling module configured to perform a sampling of the code based on the sampling point determined by the sampling point determination module.

4 Claims, 12 Drawing Sheets

FIG. 4
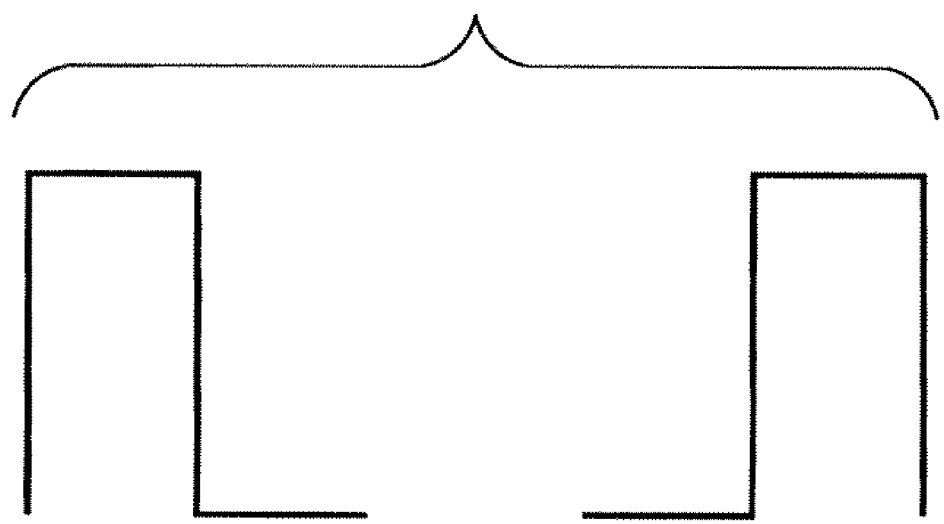
1 0    0 1
    
"0"    "1"

DIGITAL SIGNAL RECEIVER

CROSS REFERENCE TO RELATED APPLICATION(S)

The present disclosure relates to the subject matters contained in Japanese Patent Application No. 2009-168223 filed on Jul. 16, 2009, which are incorporated herein by reference in its entirety.

BACKGROUND

1. Field

The present invention relates to a digital signal receiver and a method for reproducing PPM code.

2. Description of the Related Art

In a modern television set, a remote controller employing a wireless (radio) communication system has been introduced into the market instead of a remote controller employing an infrared communication system. In JP-A-2001-111633, it is proposed to design an automatic ticket gate, as such system employing a wireless communication, to cope with a disorder of a Manchester code.

A related-art example being related to the present invention will be described using a Manchester code which is the typical signal of a Pulse Position Modulation (PPM) code.

As shown in FIG. 4, the Manchester code is such that data "0" is encoded by (1, 0), whereas data "1" is encoded by (0, 1). For this purpose, the pulse width of "1" or "0" should be defined. For the purpose of the definition, a section in which "1" or "0" corresponding to the pulse width to be defined is continuous is arranged before an actual signal is transmitted (FIG. 5). Consequently, the recurrence signals of a signal at a duty of 50% are transmitted in the section. This section in which the recurrence signals of the signal at the duty of 50% are included, is set as a preamble section. Besides, a sampling point for reproducing the PPM signal can be determined by defining the pulse width.

A sampling cycle for determining the sampling point can be obtained by the average value of the pulse widths at the duty of 50% in the preamble section. Therefore, the sampling cycle can be obtained by the following Expression (1) in a case where n pulses exist in the preamble section as in figures to be stated below:

$$Sf = (a+b+c+d+e+f+\ldots)/n \quad (1)$$

It is considered for the reproduction of an actual signal that a data sampling process is performed at a sampling point which is one clock or 2 clocks after the number of clocks determined by the multiple of the cycle of the average value, from a certain determined reference point.

Depending upon the characteristic of a pulse transmission line, however, a histogram of pulse width generation does not have the duty of 50%, and moreover, a large discrepancy appears as shown in FIG. 10.

When the sampling point is set at the point which is 2 clocks after the number of clocks determined by the multiple of the cycle of the average value, erroneous sampling proceeds as shown in FIG. 11.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 4 is a diagram showing Manchester codes.

DETAILED DESCRIPTION OF THE EMBODIMENTS

Figure 1:
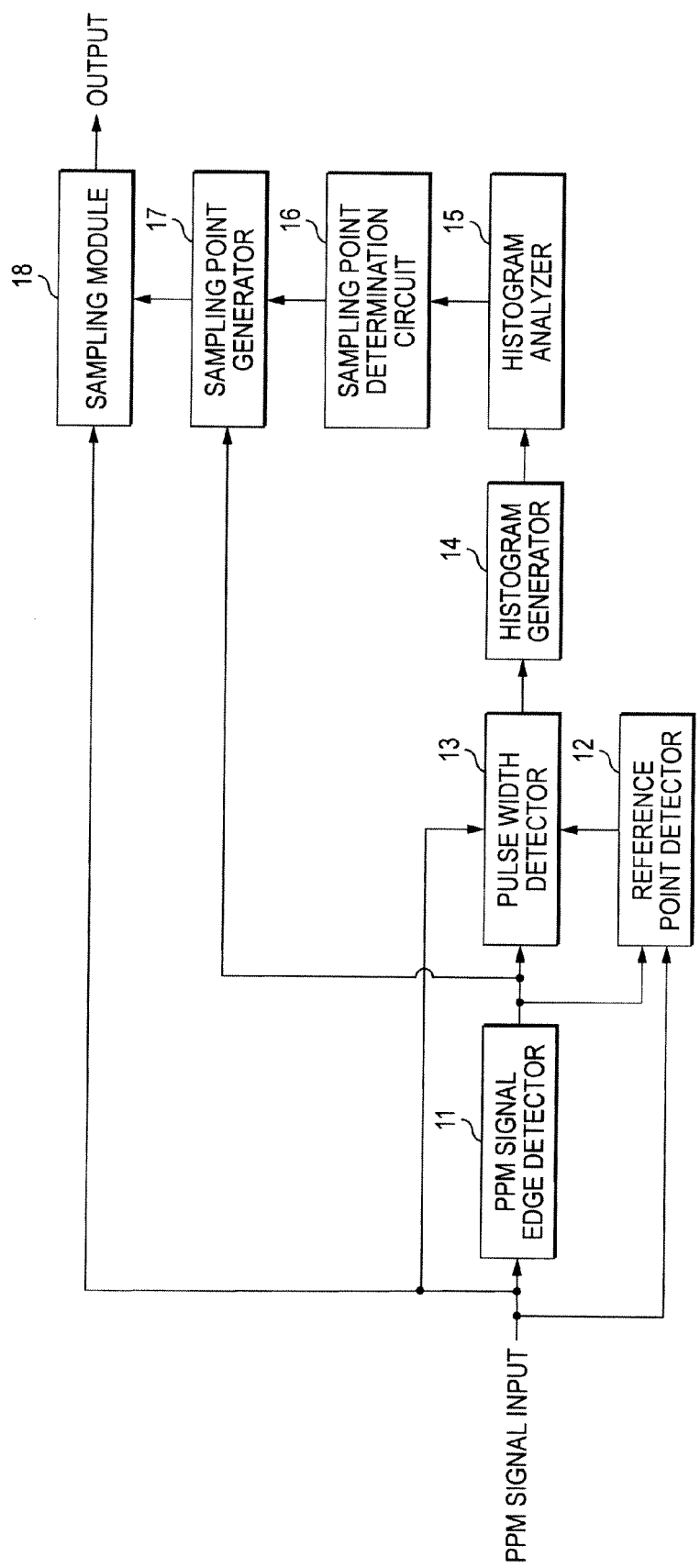
FIG. 1 is a schematic block diagram showing an apparatus (system) of an embodiment.

Hereinafter, an embodiment of the invention will be described with reference to the accompanying drawings. In the following description, common reference numerals are assigned to common components and elements throughout the drawings.

First Embodiment

A first embodiment according to the present invention will be described with reference to FIGS. 1 through 4.

FIG. 1 illustrates a block diagram showing one embodiment of this invention.

In the related-art example, the state where the PPM signals are not properly reproduced on account of the occurrence of the erroneous sampling has been illustrated by the timing chart of FIG. 11, and the embodiment will be described by taking the PPM signals shown in FIG. 11, as an example.

Figure 2:
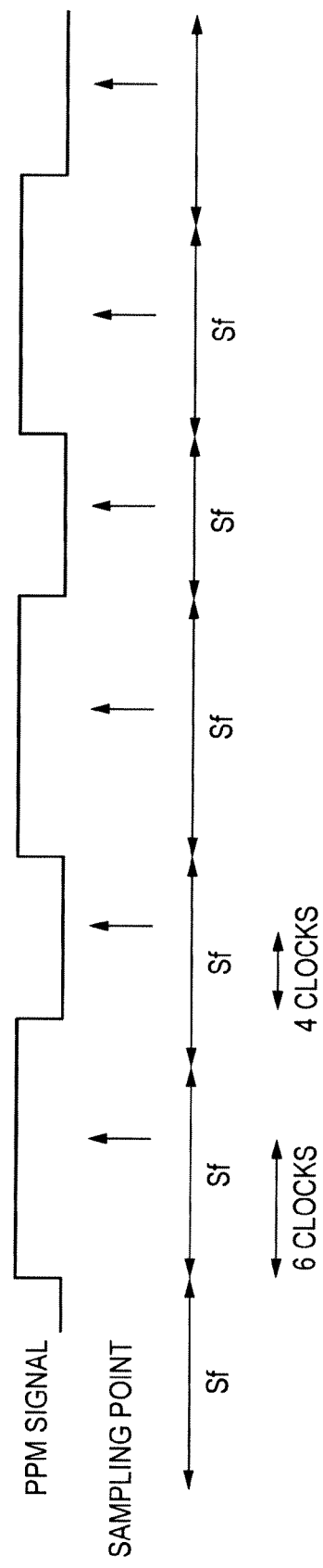
FIG. 2 is a timing chart showing the operation of the apparatus (system) of the embodiment.
Figure 3:
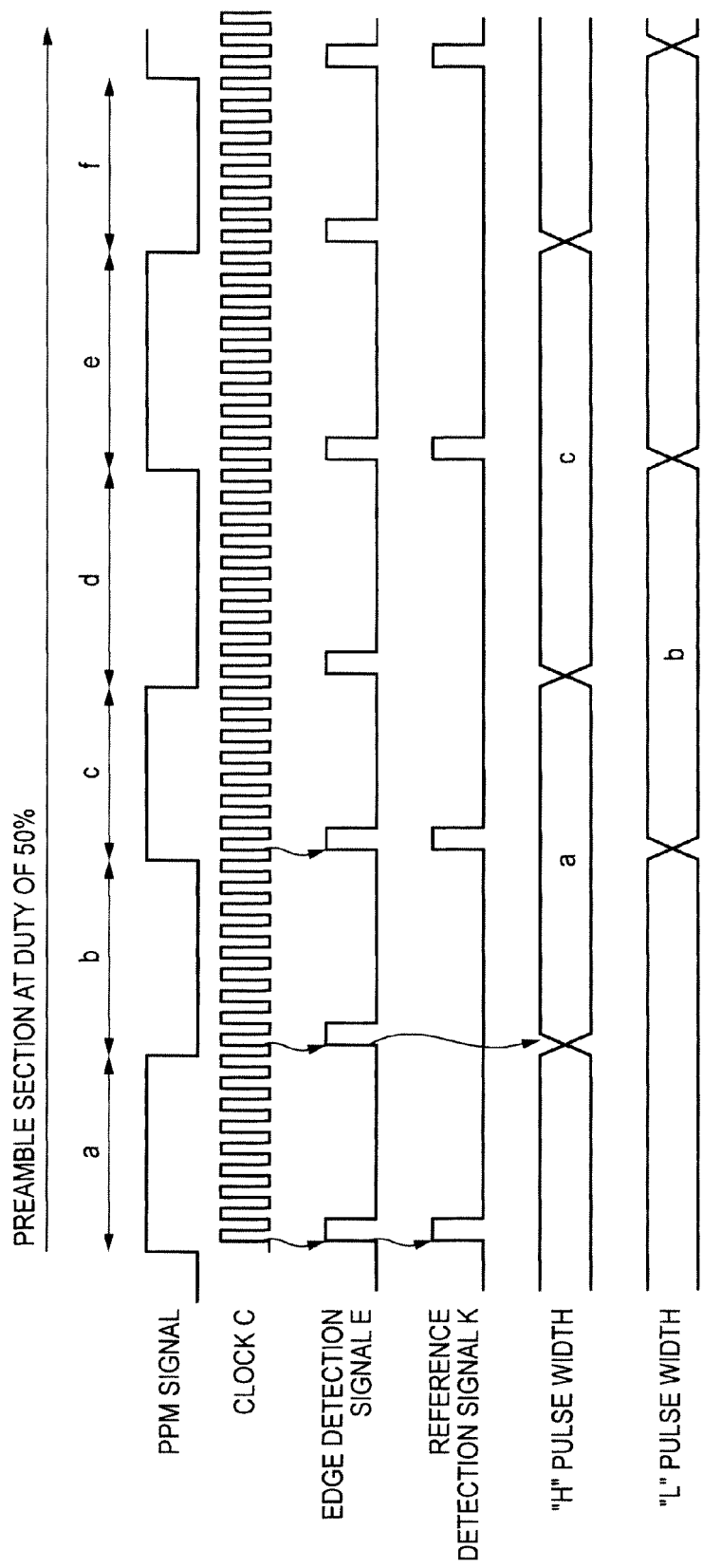
FIG. 3 is a timing chart showing the operation of the apparatus (system) of the embodiment.
Figure 11:
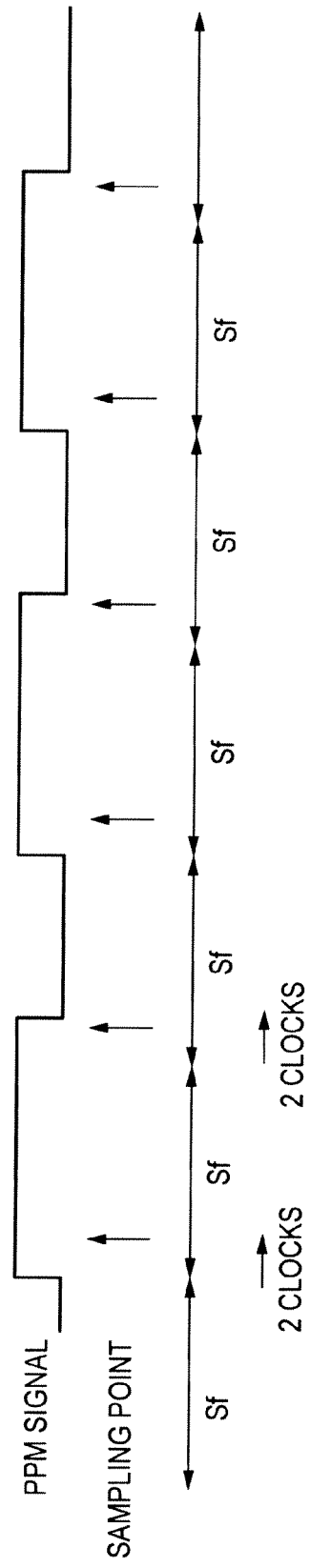
FIG. 11 is a timing chart showing the operation of an apparatus (system) of a related-art example.

In this embodiment, the pulse widths of "H" and "L" are detected by a pulse width detector from an edge detection signal and a reference point detection signal as shown in FIG. 3, with respect to that preamble signal as shown in FIG. 2 which are formed by PPM signals identical to the PPM signals shown in FIG. 11.

A PPM signal edge detector 11 detects the rise of the section a of the PPM signal, the fall of the section b thereof, etc. as the edge detection signals E in response to the rises of clocks C from a clock generator not shown.

A reference point detector 12 detects the edge detection signals E which are in the pulse sections of "H", as the reference point detection signals K. A pulse width detector 13 counts the clocks C, thereby to output an "H" pulse width value a, an "H" pulse width value b, etc. in succession as shown in FIG. 3, at the timings of the edge detection signals E.

Figure 10:
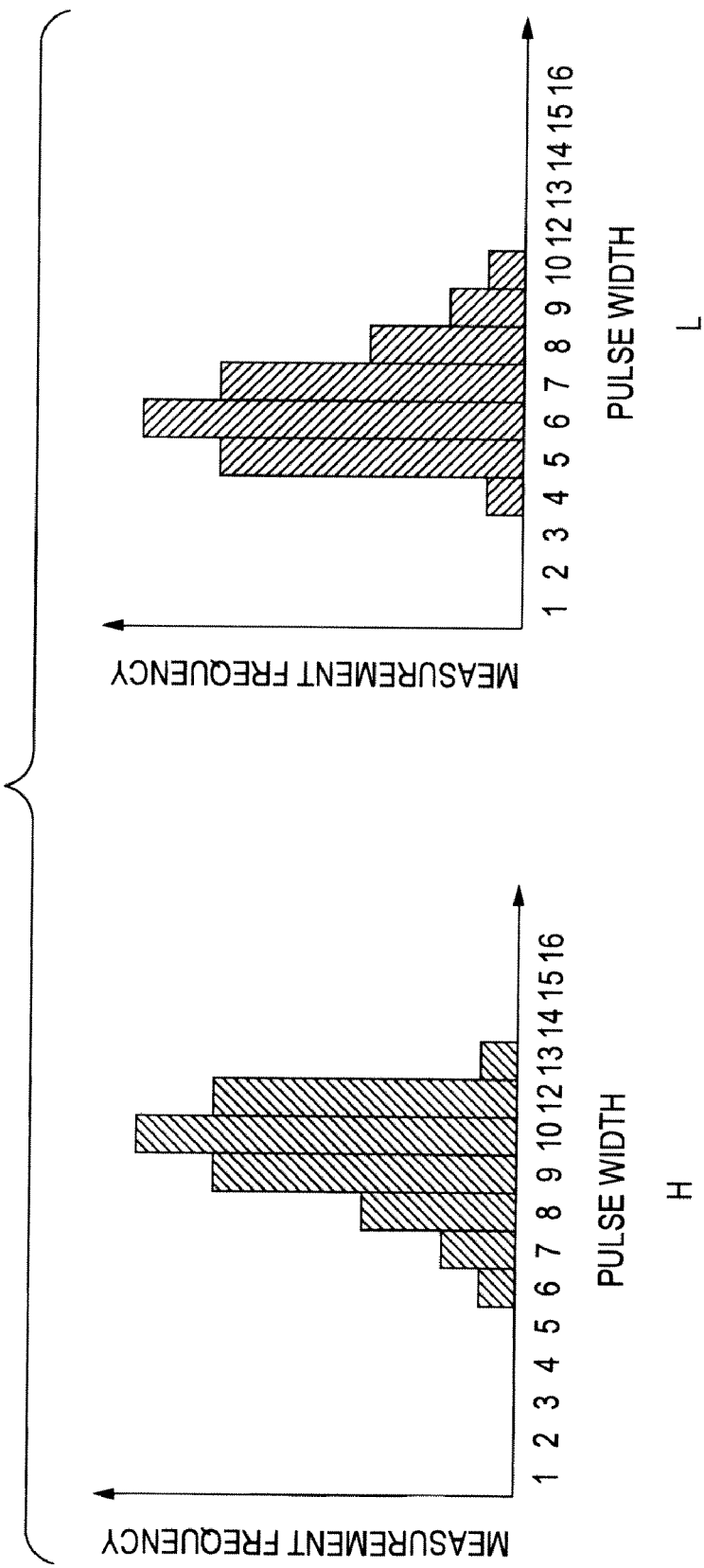
FIG. 10 is a histogram showing the operation of an apparatus (system) of a related-art example.

A histogram generator 14 generates a histogram corresponding to FIG. 10, on the basis of the values of the detected pulse widths. Here, it is also well suited that the measurement is not performed for a fixed section from the start of the signal section of the duty of 50% and for the fixed section before the end of the signal section. This is because pulses of long pulse width different from a pulse width in the signal section of the duty of 50% might be existent in the fixed sections and be influential. Owing to the addition of the processing, the Q value of the histogram, for example, enlarges in some cases. An average value can be calculated as "8" from the histogram by a histogram analyzer 15. Therefore, a sampling frequency becomes 8 clocks. This is the same as in the related-art example. The peak value of the pulse width becomes 10 being larger than the average value of 8, in the "H" section, and 6 being smaller than the average value, in the "L" section. Accordingly, the pulse width is not at the duty of 50%, and moreover, it will exhibit a large discrepancy.

Assuming that the sampling point of the "H" section is a position obtained in such a way that 6 clocks with which the detection number of pulse widths below the peak value in the "H" histogram in FIG. 10 has become extremely small (estimated to, for example, the Q-value) are added to the number of clocks being 2*n (n=0, 1, 2 . . . ) times the pulse-width average value 8, from a reference position (for example, the start point of an actual signal), a sampling clock Sh1 from the reference position can be determined by a sampling point determination circuit 16 in conformity with the following Expression (2).

$$Sh1 = 2*8*n + 6 \ (n=0, 1, 2 \ldots) \tag{2}$$

Assuming that the sampling point of the "L" section is a position obtained in such a way that the peak value of the "H" section is added to the number of clocks being 2*n (n=0, 1, 2 . . . ) times the pulse-width average value 8, from a reference position (for example, the start point of an actual signal), and that four clocks with which the detection number of pulse widths below the peak value in the "L" histogram in FIG. 10 has become extremely small are thereafter added, a sampling clock Sl1 from the reference position can be determined in conformity with the following Expression (3)

$$Sl1 = 2*8*n + 10 + 4 \ (n=0, 1, 2 \ldots) \tag{3}$$

A timing chart in which the sampling clocks Sh1 and Sl1 have been set as the sampling points by a sampling point generator 17, is shown in FIG. 2.

When the PPM signals are sampled at the sampling points indicated above, by a sampling module 18, the influences of the duty ratio fluctuation of the pulse widths and the discrepancy of the pulse widths can be made less than in the related-art example, and the PPM signals can be reliably sampled. Thus, the PPM signals can be correctly reproduced.

Second Embodiment

A second embodiment according to the present invention will be described with reference to FIG. 1 and FIGS. 3 through 5. Portions common to those of the first embodiment shall be omitted from description.

It is intended to determine sampling points which are safer than those of first embodiment. Assuming that the sampling point of an "H" section is a position obtained in such a way that 5 clocks with which the detection number of a pulse width is zero in a histogram are added to the number of clocks being 2*n (n=0, 1, 2 . . . ) times a pulse-width average value 8, from a reference position (for example, the start point of an actual signal), a sampling clock Sh2 from the reference position can be determined in conformity with the following Expression (4).

$$Sh2 = 2*8*n + 5 \ (n=0, 1, 2 \ldots) \tag{4}$$

Assuming that the sampling point of an "L" section is a position obtained in such a way that the peak value of the "H" section is added to the number of clocks being 2*n (n=0, 1, 2 . . . ) times the pulse-width average value 8, from a reference position (for example, the start point of an actual signal), and that three clocks with which the detection number of pulse widths below the peak value of the "L" section, in the histogram is zero are thereafter added, a sampling clock Sl2 from the reference position can be determined in conformity with the following Expression (5).

$$Sl2 = 2*8*n + 10 + 3 \ (n=0, 1, 2 \ldots) \tag{5}$$

Figure 5:
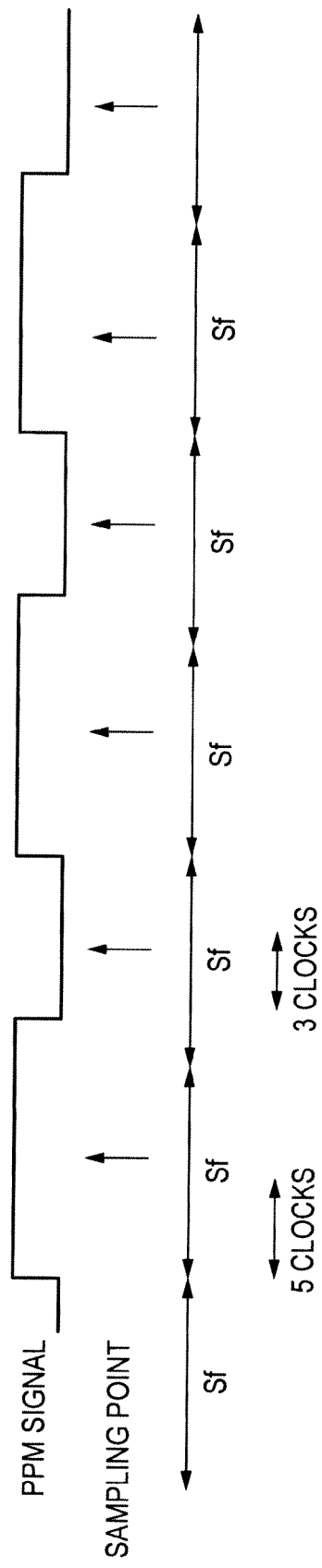
FIG. 5 is a timing chart showing the operation of an apparatus (system) of another embodiment.

A timing chart in which the sampling clocks Sh2 and Sl2 have been set as the sampling points, is shown in FIG. 5.

When the PPM signals are sampled at the sampling points indicated above, the influence of the discrepancy of the pulse widths can be made less than in the related-art example, and the PPM signals can be reliably sampled. Thus, the PPM signals can be correctly reproduced.

In the absence of the case where the detection number of the pulse widths becomes zero, the approach of first embodiment or the like may be adopted.

Third Embodiment

A third embodiment according to the present invention will be described with reference to FIGS. 1 through 8. Portions common to those of the first and second embodiments shall be omitted from description.

In the actual signal section of a PPM signal, the pulse width of "H" or "L" is detected with the rising edge (or falling edge) of a pulse as a reference point. In that case, a histogram is such that a plurality of peaks appear, in some sorts of the PPM signals. In this regard, a method for determining the optimum sampling point from the values of the pulse widths of the plurality of peaks will be described with reference to FIG. 6 and successive drawings.

Figure 6:
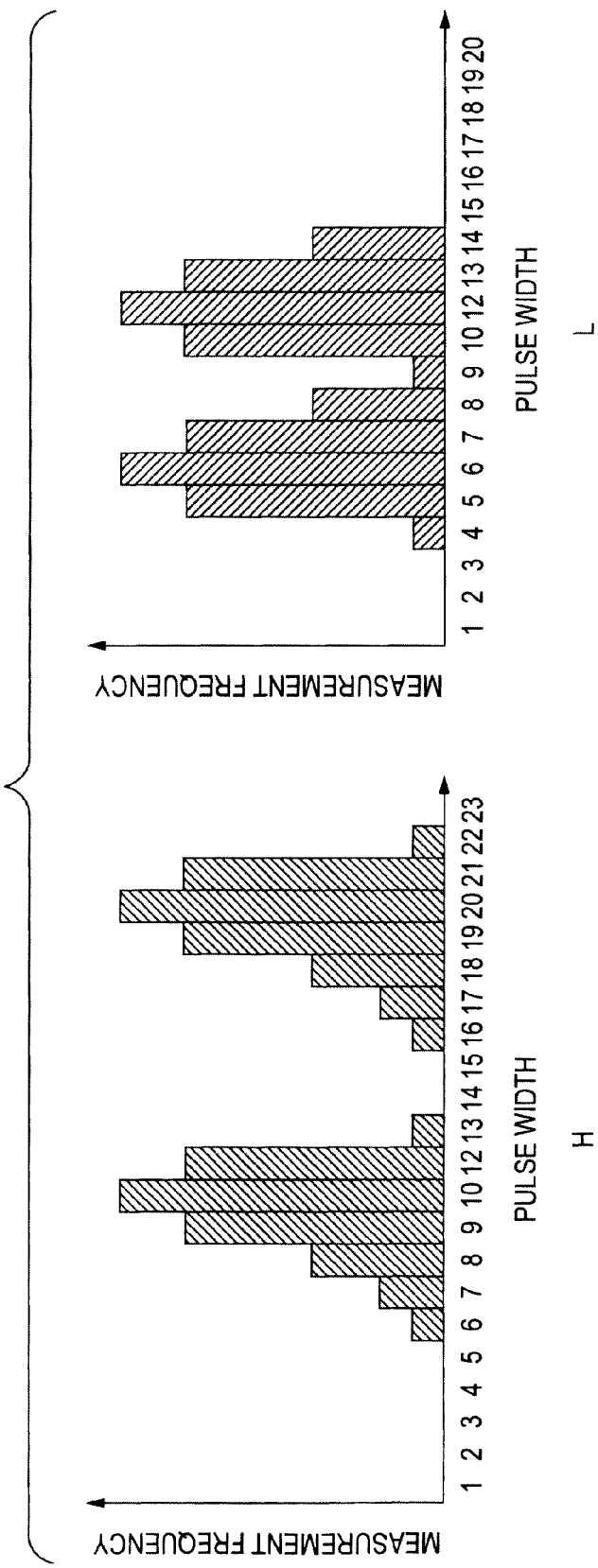
FIG. 6 is a histogram showing the operation of an apparatus (system) of another embodiment.
Figure 12:
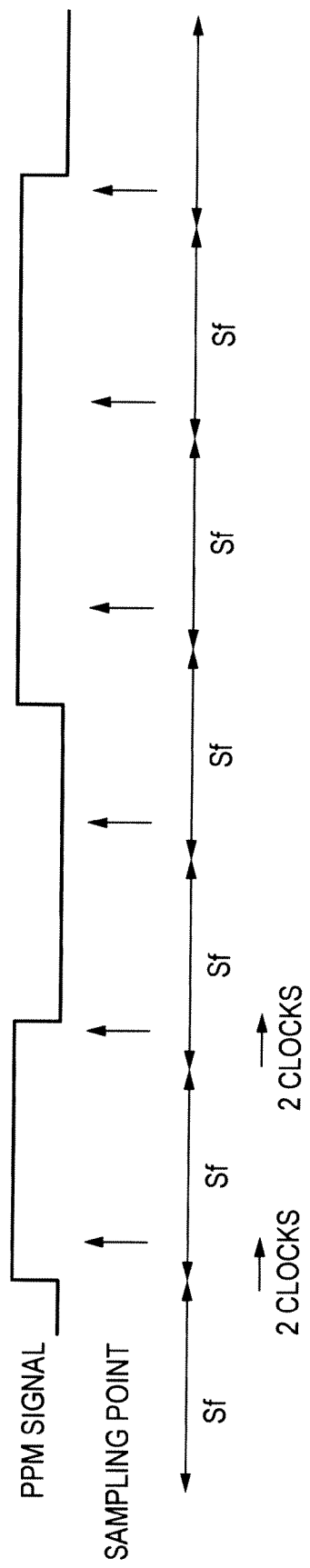
FIG. 12 is a timing chart showing the operation of an apparatus (system) of a related-art example.

It is assumed that the histogram of the pulse widths of the actual signal period has become FIG. 6. In case of the PPM coding of a Manchester code as shown in FIG. 12, pulses can also be in a pattern in which the same levels are continuous like "HH" or "LL". In that case, therefore, two peaks exist in the histogram.

FIG. 12 is a diagram showing the reproduction by the related-art example. The parts of "LL" and "HH" cannot be properly reproduced. Only one "L" can be detected at the part of "LL". Conversely, three "H"s are detected at the part of "HH".

Figure 7:
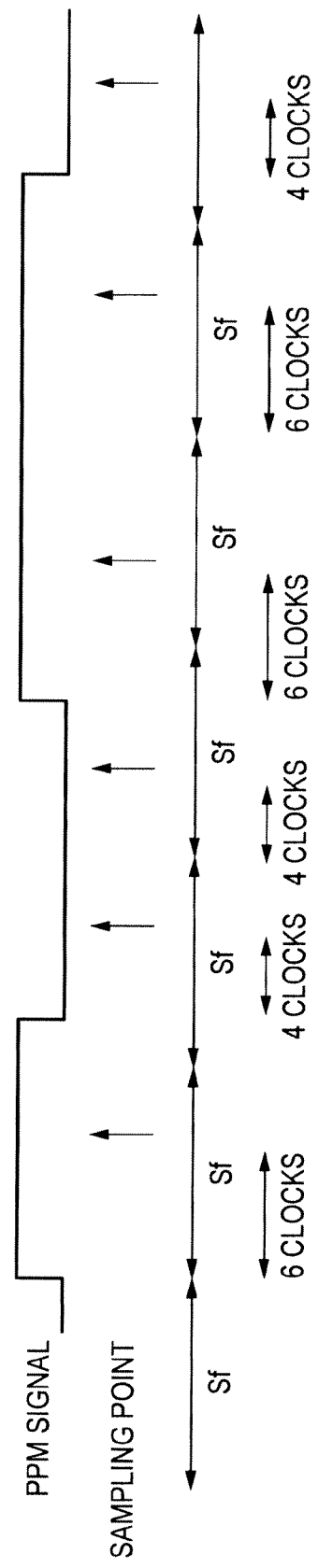
FIG. 7 is a timing chart showing the operation of an apparatus (system) of another embodiment.
Figure 8:
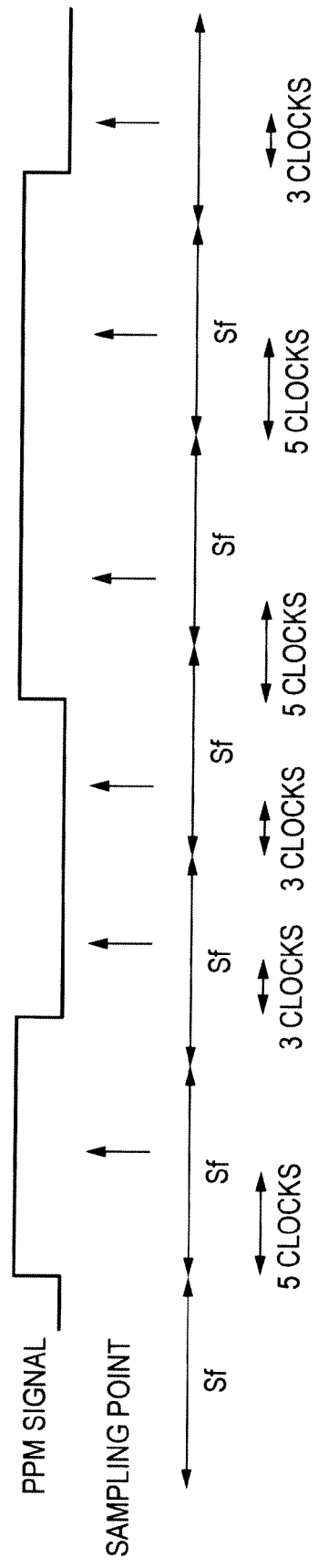
FIG. 8 is a timing chart showing the operation of an apparatus (system) of another embodiment.
Figure 9:
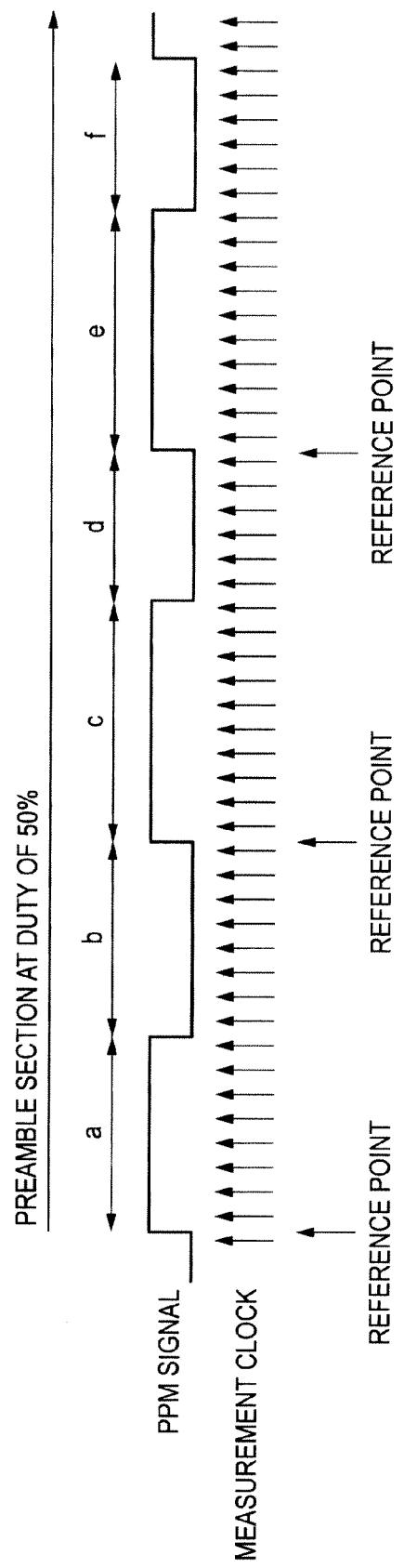
FIG. 9 is a timing chart showing the operation of an apparatus (system) of a related-art example.

FIG. 7 is a diagram showing an operation in this embodiment. At, for example, an "LL" part in FIG. 7, the continuation of "L" periods can be conjectured from edge detection signals. Therefore, the third sampling clock of "L" as reckoned from the left of the figure can be indicated by the following Equation (6).

$$2*8*n + 4 \ (n=0, 1, 2 \ldots) \tag{6}$$

In case of the next "HH", it is considered that the peak of an "L" section is 6. Assuming that the fourth sampling clock number of "H" as reckoned from the left of the figure is at a position obtained by adding 6 clocks with which the detection number of pulse widths below the peak value in the histogram of "H" has become extremely small, it can be indicated by the following Equation (7).

$$2*8*n + 6 + 6 \ (n=0, 1, 2 \ldots) \tag{7}$$

Regarding the fifth sampling clock of "H" as reckoned from the left of the figure, it can be conjectured from an edge detection signal that an "H" period has not ended. Therefore, the fifth sampling clock number of "H" as reckoned from the left of the figure can be indicated by the following Equation (8).

$$2*8*(n+1)+6 \ (n=0, 1, 2\ldots) \tag{8}$$

When the PPM signals are sampled at the sampling points indicated above, the influence of the discrepancy of the pulse widths can be made less than in the related-art example, and the PPM signals can be reliably sampled. Thus, the PPM signals can be correctly reproduced.

The PPM signals are correctly sampled as stated above, whereby these PPM signals can be correctly reproduced.

Incidentally, this invention is not restricted to the embodiments, but it can also be performed in various modifications within a scope not departing from the purport thereof. Especially in third embodiment, the sampling points may be altered during the signal reproduction, depending upon conjectured results, and the sampling points may well be altered at fixed time intervals during the signal reproduction.

Although the embodiment according to the present invention has been described above, the present invention is not limited to the above-mentioned embodiments but can be variously modified. Constituent components disclosed in the aforementioned embodiments may be combined suitably to form various modifications. For example, some of all constituent components disclosed in one of the embodiments may be removed or the constituent components disclosed in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiver, comprising:
   a signal edge detector configured to receive a signal including a Manchester code and detect an edge of the signal;
   a reference point detector configured to detect, for a pulse width detection of the signal, a reference point from a rising or falling point of the detected edge;
   a pulse width detector configured to detect a pulse width from the rising or falling point of the edge and the reference point;
   a sampling point determination module configured to generate a histogram of the pulse width and determine a sampling point for the Manchester code, based on the pulse width at which a peak of the histogram appears as an analysis result of the histogram; and
   wherein the receiver performs a sampling of the code based on a determination result.

2. The receiver of claim 1,
   wherein the sampling point for the Manchester code is set at a point obtained by adding, to an average value of the pulse width, a value smaller than the minimum pulse width at which the peak of the histogram appears.

3. The receiver of claim 1,
   wherein the sampling point for the Manchester code is set at a point obtained by adding, to an average value of the pulse width, a value smaller than the minimum pulse width at which the peak of the histogram appears and the pulse width at which an appearance number is "0".

4. The receiver of claim 1,
   wherein, when it is assumed that a plurality of peaks appear in the histogram, the sampling point determination module determines the sampling point for the Manchester code based on a plurality of pulse widths of the peaks.

* * * * *